United States Patent
Sugita et al.

(10) Patent No.: US 7,347,547 B2
(45) Date of Patent: Mar. 25, 2008

(54) PUPIL DETECTION DEVICE AND IRIS AUTHENTICATION APPARATUS

(75) Inventors: Morio Sugita, Tokyo (JP); Masahiro Wakamori, Kanagawa (JP); Takeshi Fujimatsu, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 216 days.

(21) Appl. No.: 10/555,234

(22) PCT Filed: May 18, 2005

(86) PCT No.: PCT/JP2005/009046

§ 371 (c)(1),
(2), (4) Date: Nov. 2, 2005

(87) PCT Pub. No.: WO2006/006299

PCT Pub. Date: Jan. 19, 2006

(65) Prior Publication Data

US 2007/0013866 A1 Jan. 18, 2007

(30) Foreign Application Priority Data

Jul. 14, 2004 (JP) .............................. 2004-206931

(51) Int. Cl.
  *A61B 3/10* (2006.01)
  *A61B 3/14* (2006.01)

(52) U.S. Cl. ...................................... 351/205; 351/206

(58) Field of Classification Search ........ 351/205–223; 382/117–123

See application file for complete search history.

(56) References Cited

U.S. PATENT DOCUMENTS

2006/0291702 A1* 12/2006 Miessbacher ............... 382/117

FOREIGN PATENT DOCUMENTS

| JP | 06-138373 | 5/1994 |
| JP | 2001-167252 | 6/2001 |
| JP | 2002-119477 | 4/2002 |
| JP | 2003-317102 | 11/2003 |
| JP | 2004-021406 | 1/2004 |
| WO | WO 94/09446 | 4/1994 |

OTHER PUBLICATIONS

Japanese Search Report for PCT/JP2005/009046, dated Jul. 19, 2005 and English translation of Form PCT/ISA/210.

* cited by examiner

*Primary Examiner*—M. Hasan
(74) *Attorney, Agent, or Firm*—RatnerPrestia (57) ABSTRACT

Pupil candidate detection unit for detecting positions of pupil candidates in an eye image; and luminance difference calculation unit for obtaining a difference between a maximum value and a minimum value of an image data of an eye image on a circumference of a circle having a center at center coordinates of a pupil candidate and a predetermined radius are provided, and when the output of luminance difference calculation unit is larger than the predetermined threshold, the corresponding pupil candidate is determined not to be the pupil.

6 Claims, 7 Drawing Sheets

PUPIL DETECTION DEVICE AND IRIS AUTHENTICATION APPARATUS

This Application is a U.S. National Phase Application of PCT International Application PCT/JP2005/009046.

TECHNICAL FIELD

The present invention relates to an iris authentication apparatus used for personal authentication or the like and, more specifically, to a pupil detection device for detecting the position of a pupil from an eye image (image including an eye).

BACKGROUND ART

Hitherto, various methods for detecting the position of a pupil from an eye image are proposed, and for example, a method of binarizing image data of the eye image (hereinafter, abbreviated as "eye image data") and detecting a circular area in an area of low-luminance level, and a method of calculating a contour integral of an image luminance I (x, y) with respect to an arc of a circle having a radius r and center coordinates (x0, y0) and calculating a partial derivative of the calculated amount relating to r in association with increase in the radius r are known. The structure in the aforementioned related art is disclosed, for example, in JP-T-8-504979. Several methods of increasing detection accuracy by eliminating the effects of eyelash or sunlight are also disclosed. The structure in the aforementioned related art is disclosed, for example, in JP-A-2002-119477.

In order to detect the pupil with high degree of accuracy using these methods, it is necessary to process a huge amount of image data at high-speed, and hence it is difficult to process the image data of the eye image on real time basis even though a large CPU having a high processing capability or a bulk memory is used in the status quo. Also, when the processing amount of the CPU is reduced to a degree which enables real time processing of the image data, there may arise a problem such that the detection accuracy is lowered.

DISCLOSURE OF THE INVENTION

The present invention provides a pupil detection device and an iris authentication apparatus which can detect the position of a pupil at high-speed and with high degree of accuracy.

The pupil detection device of the present invention includes: a pupil candidate detection unit for detecting positions and radii of pupil candidates which may be candidates of a pupil in an eye image, and a luminance difference calculation unit for obtaining a difference between a maximum value and a minimum value of luminance of an image data of an eye image on a circumference of a circle having a center at center coordinates of the pupil candidate and a predetermined radius, and when the difference of brightness obtained by the luminance difference calculation unit is larger than a predetermined threshold, the corresponding pupil candidate is determined not to be the pupil.

REFERENCE NUMERALS

10 iris authentication apparatus
20 image pickup unit
30 illumination unit
40 authentication processing unit
100, 200 pupil detection device
110 pupil candidate detection unit
120 luminance difference calculation unit
220 image data extraction unit
230 contour integrating unit
240 luminance difference calculation unit
250 pupil radius detection unit
260 pointer unit
280 pupil position detection unit

BEST MODE FOR CARRYING OUT THE INVENTION

A pupil detection device of the present invention includes a pupil candidate detection unit for detecting positions and radii of pupil candidates which may be candidates of a pupil in an eye image, and a luminance difference calculation unit for obtaining a difference between a maximum value and a minimum value of luminance of an image data of an eye image on a circumference of a circle having a center at center coordinates of a pupil candidate and a predetermined radius, and when the difference of luminance obtained by the luminance difference calculation unit is larger than a predetermined threshold, the corresponding pupil candidate is determined not to be the pupil. In this arrangement, the pupil position can be detected at high-speed and with high degree of accuracy.

In the pupil detection device of the present invention, preferably, the predetermined radius is larger than the radius of the pupil candidate. In this arrangement, for example, erroneous detection such as to detect part of an eyeglass frame as the pupil by mistake can be eliminated.

The pupil detection device according to the present invention also includes an image data extraction unit for determining a plurality of concentric circles on an eye image as integrating circles respectively, and extracts image data of the eye image positioned on a circumferences of the integrating circles, a contour integrating unit for integrating the image data extracted by the image data extraction unit along the respective circumferences of the integrating circles, a pupil radius detection unit for detecting that an integrated value obtained by the contour integrating unit has changed stepwise with respect to the radius of the integrating circle, a pupil position detection unit for detecting the center coordinates of the integrating circle as the pupil position coordinates when the pupil radius detection unit detects the change stepwise, and a luminance difference calculation unit for obtaining a difference between a maximum value and a minimum value of the image data extracted by the image data extraction unit along the respective circumferences of the integrating circles, and when the output of the luminance difference calculation unit is larger than the predetermined threshold for the respective integrating circles, the integrated value of the corresponding integrating circle is determined to be ineffective. In this arrangement, the pupil can be detected in a real time basis with respect to the image data picked up by an image pickup unit with a circuit of a relatively small scale.

An iris authentication apparatus of the present invention includes the pupil detection device of the present invention. In this arrangement, the iris authentication apparatus having the pupil detection device which can detect the pupil position with high degree of accuracy at high-speed can be provided.

Referring now to the drawings, the iris authentication apparatus employing the pupil detection device in an embodiment of the present invention will be described.

First Embodiment

Figure 1:
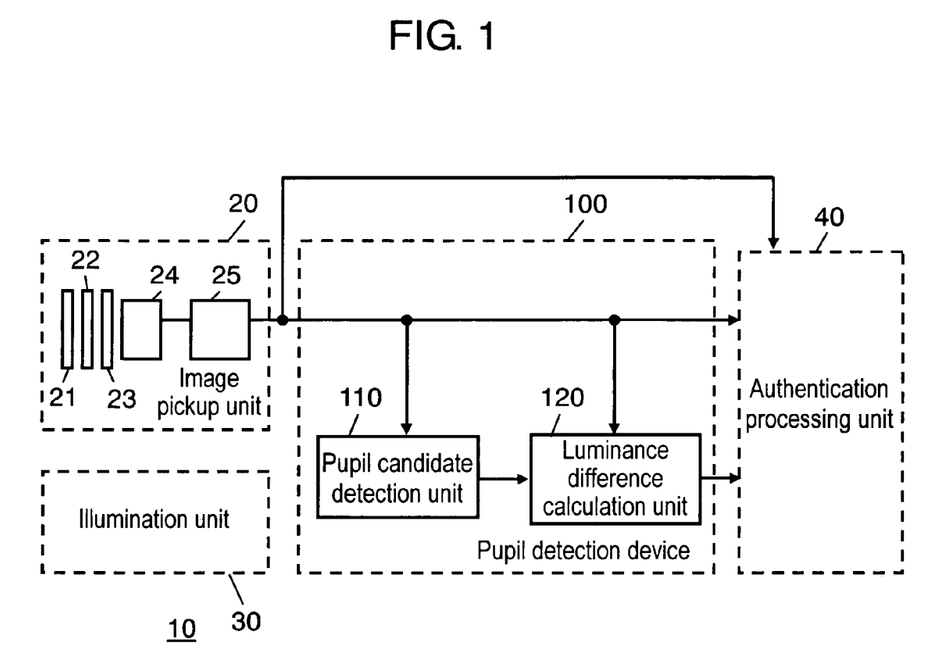
FIG. 1 is a circuit block diagram of an iris authentication apparatus using a pupil detection device according to a first embodiment of the present invention.

FIG. 1 is a circuit block diagram of iris authentication apparatus 10 employing pupil detection device 100 according to a first embodiment of the present invention. In addition to pupil detection device 100, FIG. 1 also illustrates image pickup unit 20, illumination unit 30, authentication processing unit 40 which are necessary to configure iris-authentication apparatus 10.

Iris authentication apparatus 10 according to the first embodiment includes image pickup unit 20 for picking up an eye image of a user, pupil detection device 100 for detecting the position of the pupil and the radius thereof from the eye image, authentication processing unit 40 for performing personal authentication by comparing an iris code obtained from the eye image with a registered iris code, and illumination unit 30 for irradiating near-infrared ray of a light amount suitable for obtaining the eye image for illuminating the user's eye and the periphery thereof.

Image pickup unit 20 includes guide mirror 21, visible light cut filter 22, lens 23, image pickup element 24 and preprocessing unit 25. In this embodiment, by using a fixed focal length lens as lens 23, compact and light weighted optical system and cost reduction are realized. Guide mirror 21 guides the user to place the eye to a correct image pickup position by reflecting an image of his/her own eye thereon. Then, the image of the user's eye is acquired by image pickup element 24 through visible light eliminating filter 22 and lens 23. Preprocessing unit 25 acquires an image data component from the output signal from image pickup element 24, performs processing such as gain adjustment, which is required as the image data, and outputs as the eye image data of the user.

Pupil detection device 100 includes pupil candidate detection unit 110, and luminance difference calculation unit 120. Pupil candidate detection unit 110 binarizes the eye image data outputted from preprocessing unit 25 and selects an area of low-luminance therefrom. Then, the largest inscribing circle is obtained for each of selected one or a plurality of areas, and the center coordinates of the inscribed circle is outputted to luminance difference calculation unit 120 as positional coordinates of the pupil candidate which is estimated to be the pupil, and the radius of the inscribed circle is outputted to the same as the pupil radius of the pupil candidate.

For each of the pupil candidates, luminance difference calculation unit 120 obtains the maximum value and the minimum value of image data (that is, luminance data) on a circumference of a circle being centered at the center coordinates of the pupil candidate and having a radius slightly larger than that of the pupil candidate (for example, 1.2 to 1.5 times the radius of the pupil candidate), and calculates the difference therebetween. When the difference does not exceed a predetermined threshold (hereinafter, referred to as "luminance difference threshold"), it is determined that the corresponding pupil candidate is the real pupil, and the center coordinates and the radius of the pupil is outputted to authentication processing unit 40.

As the luminance difference threshold at this time is preferably set to a value slightly larger than estimated variations in luminance data on the circumference. Empirically, a value larger than the difference between the average luminance of the iris and the average luminance of the pupil, and smaller than the difference of the average luminance of the skin and the average luminance of the pupil is recommended. For example, in the case of the luminance having 256 levels, an average luminance of the pupil is on the order of level equals 40, an average luminance of the iris is on the order of level equals 100, and an average luminance of the skin is on the order of level equals 200. Therefore, luminance difference threshold may be set to a value between 60 and 160.

Authentication processing unit 40 cuts out an iris image from the eye image data based on the center coordinates of the pupil determined as the real pupil by luminance difference calculation unit 120. Then, authentication processing unit converts the iris image into a specific iris code which indicates a pattern of the iris, and compares the same with the registered iris code to perform authentication action.

Figure 2:
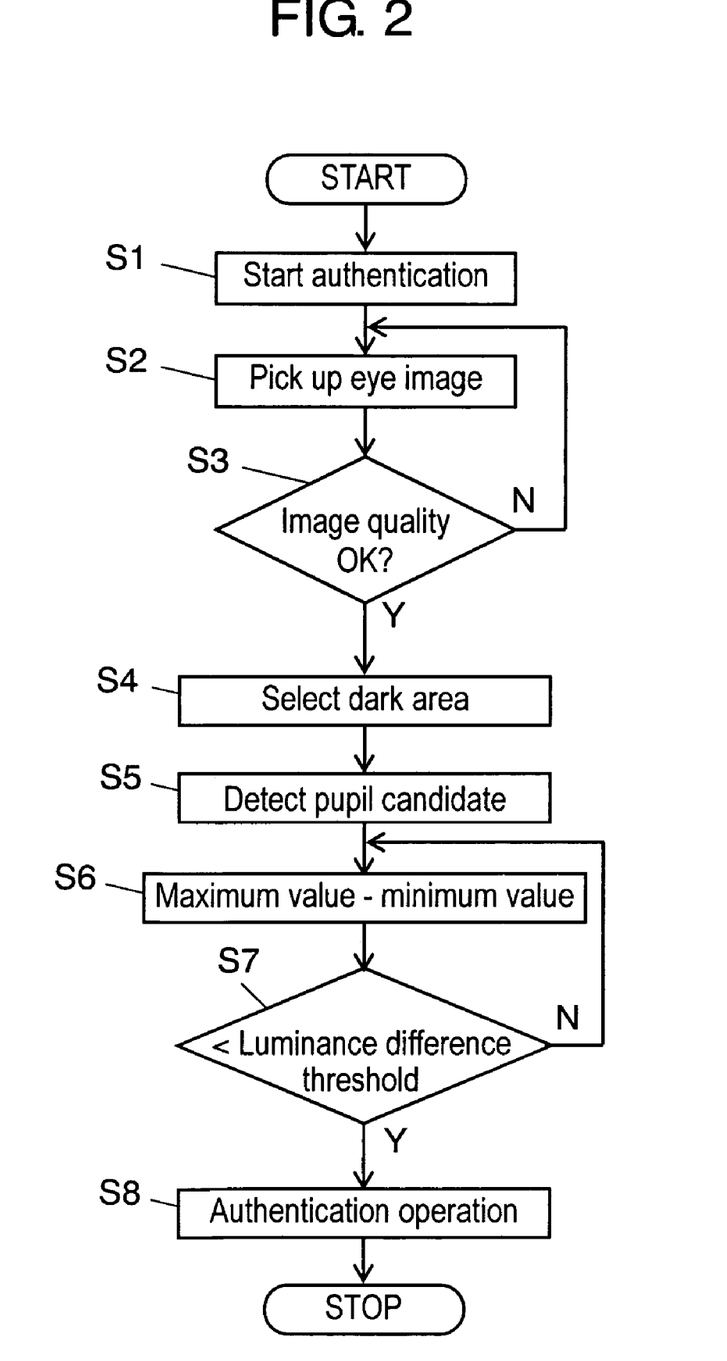
FIG. 2 is a flowchart showing an operation of the iris authentication apparatus using the pupil detection device according to the first embodiment of the present invention.

FIG. 2 is a flowchart showing an action of iris authentication apparatus 10 in which pupil detection device 100 according to the first embodiment of the present invention is employed.

The user starts authentication action by, for example, standing in front of iris authentication apparatus (S1). Then, image pickup unit 20 picks up an eye image of the user (S2). Preprocessing unit 25 determines whether or not the image quality of the eye image such as focus, luminance, contrast, or the like is adequate or not. When it is not adequate, required processing such as illumination control or instruction for the user is carried out, and the eye image is acquired again (S3).

When the obtained eye image is adequate, pupil detection device 100 detects the position of the pupil and the size thereof. More specifically, pupil candidate detection unit 110 binarizes the acquired eye image data. Then, a dark area is selected from the binarized eye image. At this time, an area excessively large or a small area in comparison with the estimated pupil size may be excluded from the beginning (S4). Subsequently, the largest circle which inscribes the selected dark area is obtained, and the center coordinates and the radius are outputted as the pupil candidate (S5).

Luminance difference calculation unit 120 obtains the maximum value and the minimum value of the luminance data on the circumference of the circle which has the center at the center coordinates of the pupil candidate and a radius larger than the radius thereof, and calculates the difference therebetween (S6). Then, when the difference does not exceed the luminance difference threshold, the selected pupil candidate is determined to be the correct pupil, and the center coordinates and the radius of the pupil is outputted to authentication processing unit 40. When the difference is larger than the luminance difference threshold, the selected pupil candidate is determined not to be the pupil, and selects the next pupil candidates, and the procedure goes back to Step S6 (S7).

When the pupil is correctly detected, authentication processing unit 40 cuts out an iris image from the eye image data based on the center coordinates of the pupil. Then, the iris image is converted into a specific iris code indicating a pattern of the iris, and is compared with the registered iris code, thereby carrying out the authentication operation (S8).

Figure 3A:
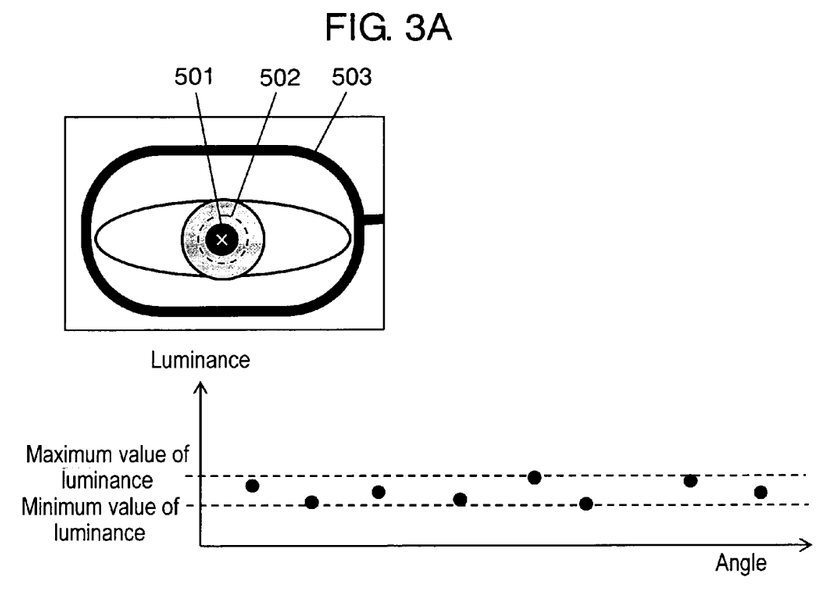
FIG. 3A is a drawing showing an example of an eye image when an integrating circle is positioned in an iris area and luminance at the same moment.
Figure 3B:
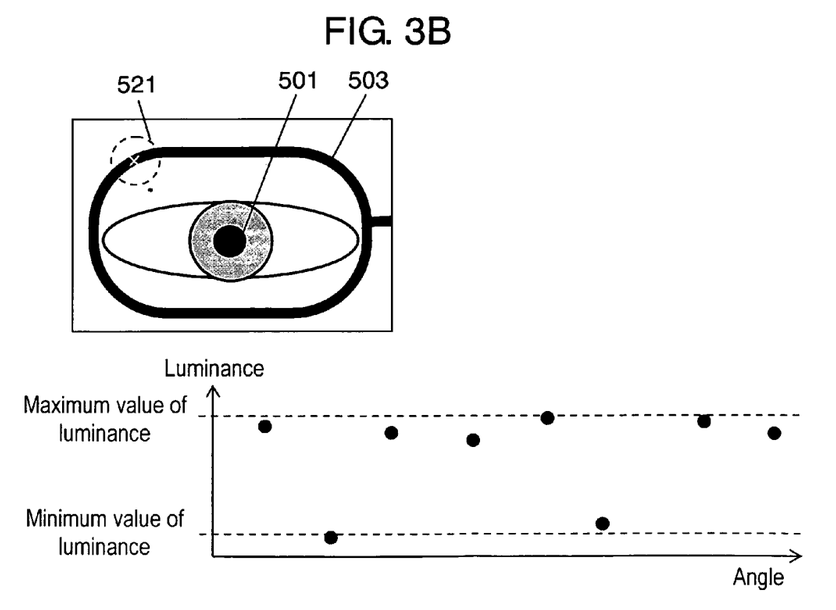
FIG. 3B is a drawing showing an example of the eye image when the integrating circle is positioned on an eyeglass frame and luminance of the same moment.

FIG. 3A and FIG. 3B are drawings for explaining the operation of luminance difference calculation unit 120 according to the first embodiment of the present invention. FIG. 3A is a drawing showing an example of an eye image when the integrating circle is positioned in the iris area and the luminance at the same moment, and FIG. 3B is a drawing showing an example of an eye image when the integrating circle is positioned on an eyeglass frame and luminance of the same moment.

When the pupil candidate is real pupil 501, as shown in FIG. 3A, luminance difference calculation unit 120 obtains the luminance data of an eye image positioned on a circumference of circle 502 having a center at the center coordinates of pupil 501 and a radius slightly larger than the radius of pupil 501 and calculates the difference between the maximum value and the minimum value. Since the above-described circumference at this time is positioned on the iris portion, the maximum value and the minimum value of the luminance are both within the limited range of luminance, and the difference does not exceed the luminance difference threshold.

However, when the pupil candidate is not the real pupil, for example, when pupil candidate detection unit 110 detects part of black eyeglass frame 503 as the pupil candidate as shown in FIG. 3B, the luminance on circumference 521 is low on eyeglass frame 503 and high on the skin, and hence the difference between the maximum value and the minimum value of the luminance is large. In this manner, by calculating the difference between the maximum value and the minimum value of the luminance on the circumference of circle 502 having the center at the center coordinates of the pupil candidate, whether or not the pupil candidate is the real pupil can be determined.

Pupil detection device 100 in this embodiment is provided with luminance difference calculation unit 120 for determining whether or not the pupil candidate detected by pupil candidate detection unit 110 is the real pupil. Therefore, the detection accuracy for the pupil candidates by themselves needs not to be very high as long as the real pupil is included in the pupil candidates. Therefore, by lowering the detection accuracy for the pupil candidates to a level which can be processed with a relatively less expensive CPU, and finding the real pupil from the pupil candidates using luminance difference calculation unit 120, the pupil position can be detected with high degree of accuracy at high-speed.

Second Embodiment

Figure 4A:
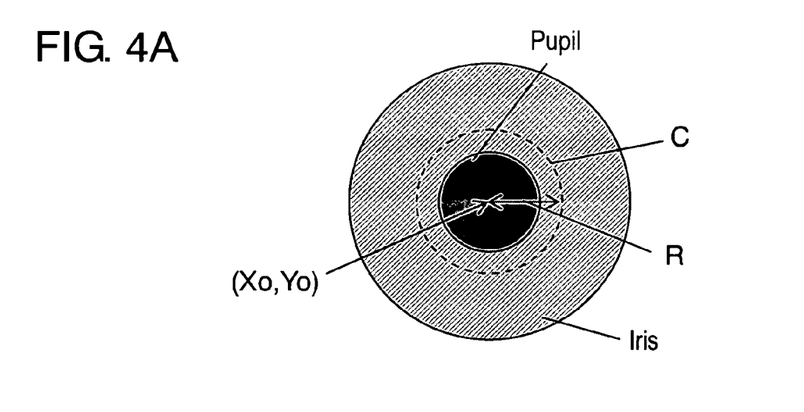
FIG. 4A is a drawing showing an example of an image including a pupil.
Figure 4B:
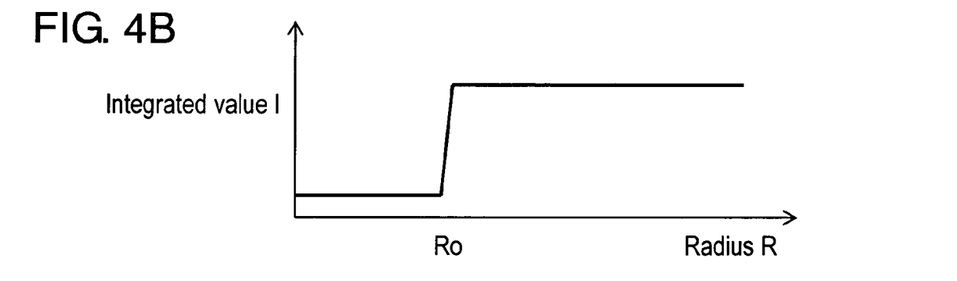
FIG. 4B is a drawing showing an integrated value with respect to a radius of the integrating circle.
Figure 4C:
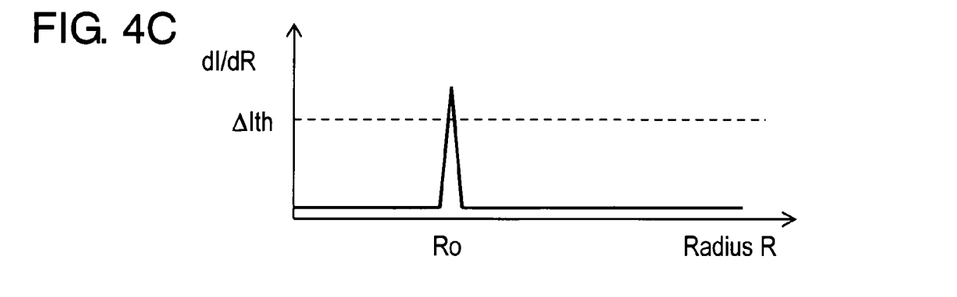
FIG. 4C is a drawing showing a value obtained by differentiating the integrated value by the radius of the integrating circle.
Figure 4D:
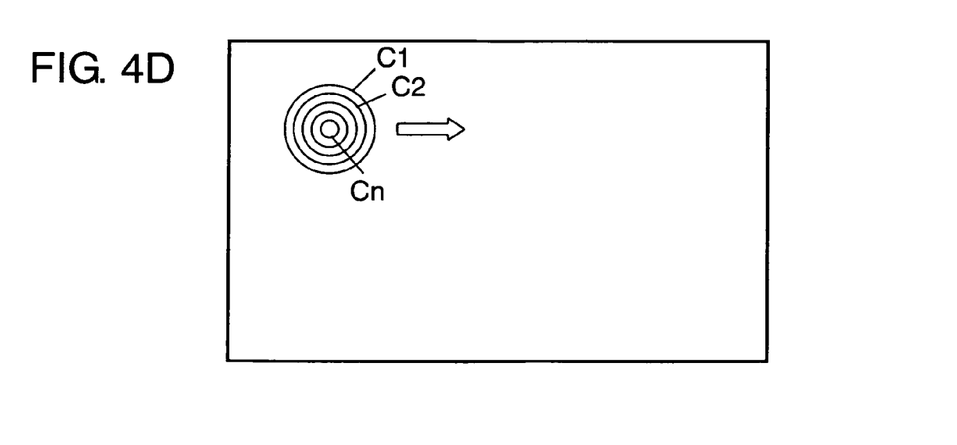
FIG. 4D is a drawing showing the integrating circles moving on an eye image.

FIG. 4A to FIG. 4D are drawings for explaining a method of detecting the pupil performed by pupil detection device according to the second embodiment of the present invention. FIG. 4A is a drawing showing an example of an image including a pupil. FIG. 4B is a drawing showing an integrated value with respect to the radius of the integrating circle. FIG. 4C is a drawing showing a value obtained by differentiating the integrated value by the radius of the integrating circle. FIG. 4D is a drawing showing the integrating circles which move on an eye image.

The image including the pupil includes a low luminance area of a disk shape showing the pupil, and a middle luminance area of an annular shape indicating the iris outside thereof exiting therein as shown in FIG. 4A. Therefore, when the contour integral of the image data is performed along circumferences of integrating circles C differentiated in radius R from the positional coordinates $(X_0, Y_0)$ of the center of the pupil in sequence, integrated value I changes stepwise on the border of pupil radius $R_0$, as shown in FIG. 4B. Therefore, by obtaining the radius of the integrating circle when value dI/dR obtained by differentiating integrated value I by radius R exceeds predetermined threshold $\Delta$Ith, pupil radius $R_0$ can be known.

Based on the idea described above, pupil detection device according to the second embodiment detects the positional coordinates $(X_0, Y_0)$ of the pupil and pupil radius $R_0$. As shown in FIG. 4D, n integrating circles $C_1$-$C_n$ having the same center coordinates and different radius are set on the eye image, and the image data located on the circumference is integrated with respect to each integrating circle $C_i$ (i=1-n). Realistically, an average value of the image data of pixels located on the circumferences of each integrating circle $C_i$ is calculated. Alternatively, a certain number (m) of the pixels are selected from the pixels located on the circumference to add the image data thereof.

In the second embodiment, number n of the concentric integrating circles was assumed to be 20, and m=8 pixels were selected from the pixels located on the circumference of each integrating circle $C_i$ to add the image data to obtain integrated value I of the contour integral. When the centers of integrating circles $C_1$-$C_n$ coincide with the center of the pupil, as described above, integrated value $I^i$ with respect to each integrating circle $C_i$ changes stepwise. Therefore, when difference value $\Delta I_i$ with respect to radius R of integrated value $I_i$ is obtained, the values reach extremely large value at a point equal to pupil radius $R_0$.

However, since integrated value $I_i$ changes gently when the centers of integrating circles $C_1$-$C_n$ do not coincide with the center of the pupil, difference value $\Delta I_i$ is not a large value. Therefore, by obtaining integrating circle $C_i$ which has difference value $\Delta I_i$ larger than difference threshold $\Delta$Ith, the position of the pupil and the radius thereof can be obtained.

However, depending on the image, there is a possibility that difference value $\Delta I_i$ shows a large value accidentally. In particular, the number n of integrating circles or the number m of pixels to be selected on the respective integrating circles is reduced, the amount of calculation can be reduced, and hence pupil detection of high-speed is achieved. However, in contrast, the possibility that difference value $\Delta I_i$ shows a large value accidentally is increased, and hence the pupil detection accuracy is reduced. Therefore, in the second embodiment, luminance difference calculation unit 240 is provided for calculating difference $B_i$ between the maximum value and the minimum value of the luminance on the circumferences of each integrating circle $C_i$, and, only when the difference $B_i$ is smaller than luminance difference threshold Bth, integrated value $I_i$ or difference value $\Delta I_i$ is considered to be effective, so that lowering of the pupil detection accuracy is prevented.

Then, by moving integrating circles $C_1$-$C_n$ to the respective positions on the eye image, the above-described operation is repeated. In this manner, by obtaining the center coordinates (X, Y) of integrating circle $C_i$ when difference value $\Delta I_i$ is large and radius R at that time, the positional coordinates $(X_0, Y_0)$ of the pupil and pupil radius $R_0$ can be obtained.

In the case of the luminance having 256 levels, an average luminance of the pupil is on the order of level equals 40, an average luminance of the iris is on the order of level equals 100, and an average luminance of the skin is on the order of level equals 200. Therefore, luminance difference threshold Bth may be set to a value between 60 and 160 as in the first embodiment.

Difference threshold $\Delta$th may be set to a range between ¼ to ⅕ times the difference between the integrated value when the integrating circle is located on the iris and the integrated value when the integrating circle is located on the pupil. In the second embodiment, integrated value I when the integrating circle is located on the pupil is about 40×8=320, and integrated value I when the integrating circle is located on the iris is about 100×8=800. Therefore, difference threshold $\Delta$Ith is set to the order of half the difference 480, that is, 240.

Figure 5:
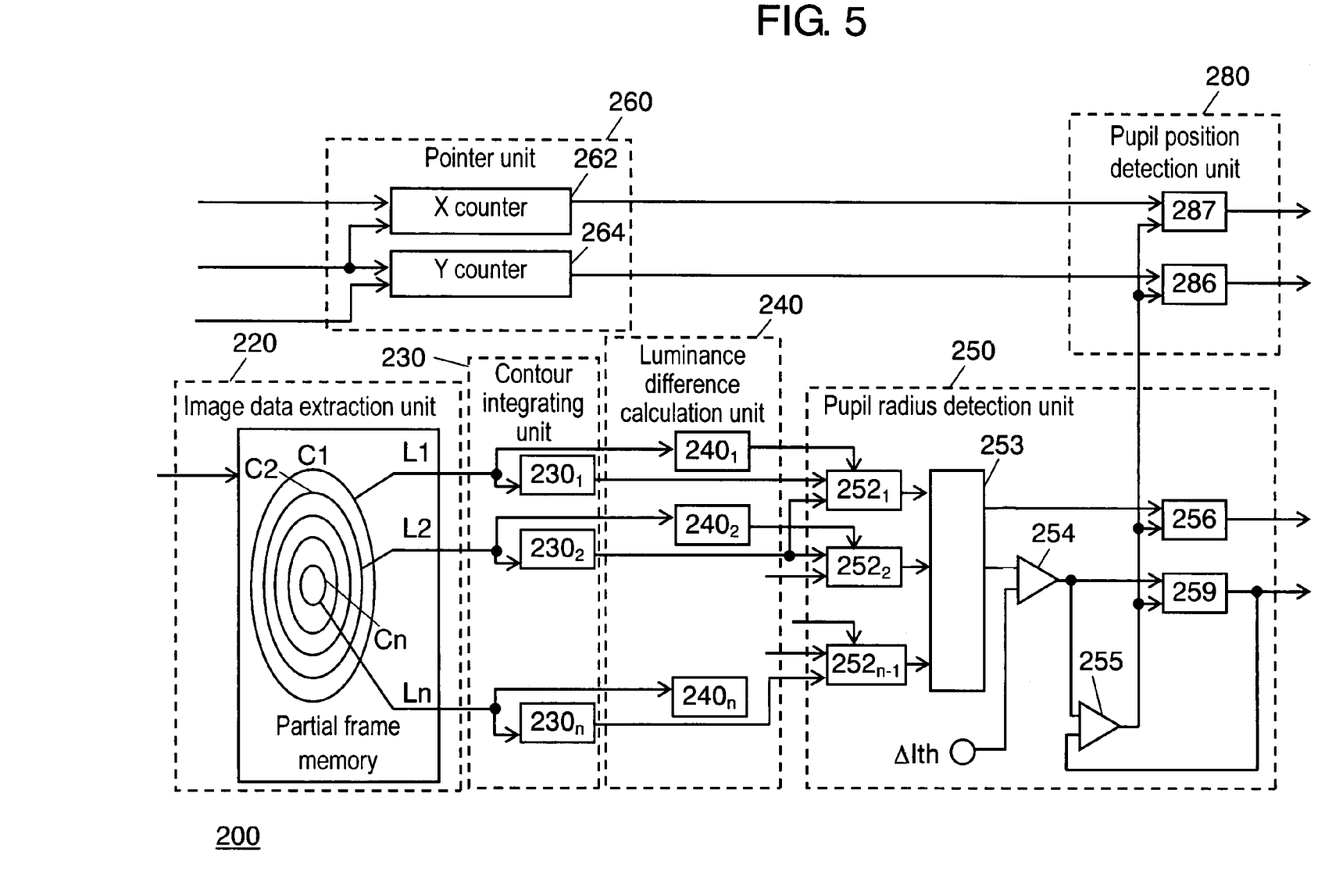
FIG. 5 is a circuit block diagram of a pupil detection device according to a second embodiment of the present invention.

FIG. 5 is a circuit block diagram of pupil detection device 200 according to the second embodiment of the present invention. Although not shown, the iris authentication apparatus can be configured by adding the image pickup unit, the illumination unit, and the authentication processing unit to pupil detection device 200.

As shown in FIG. 5, pupil detection device 200 includes image data extraction unit 220 for setting integrating circles $C_1$-$C_n$ on the eye image to extract the image data on the circumference of each integrating circle $C_i$, contour integrating unit 230 for performing contour integral on the extracted image data for each integrating circle $C_i$, luminance difference calculation unit 240 for calculating difference $B_i$ between the maximum value and the minimum value of the image data for each integration circle, and pupil radius detection unit 250 for obtaining difference value $\Delta I_i$ of integrated value $I_i$ with respect to radius $R_i$ and, when maximum value $\Delta I$ of the difference value is larger than difference threshold $\Delta$Ith, considering that the pupil is detected and outputting radius R of the corresponding integrating circle as pupil radius $R_0$, pointer unit 260 showing the center coordinates (X, Y) of integrating circles $C_1$-$C_n$, and pupil position detection unit 280 for outputting the output of pointer unit 260 when pupil radius detection unit 250 detects the pupil as the X-coordinate $X_o$ and Y-coordinate $Y_o$ of the pupil.

Figure 6:
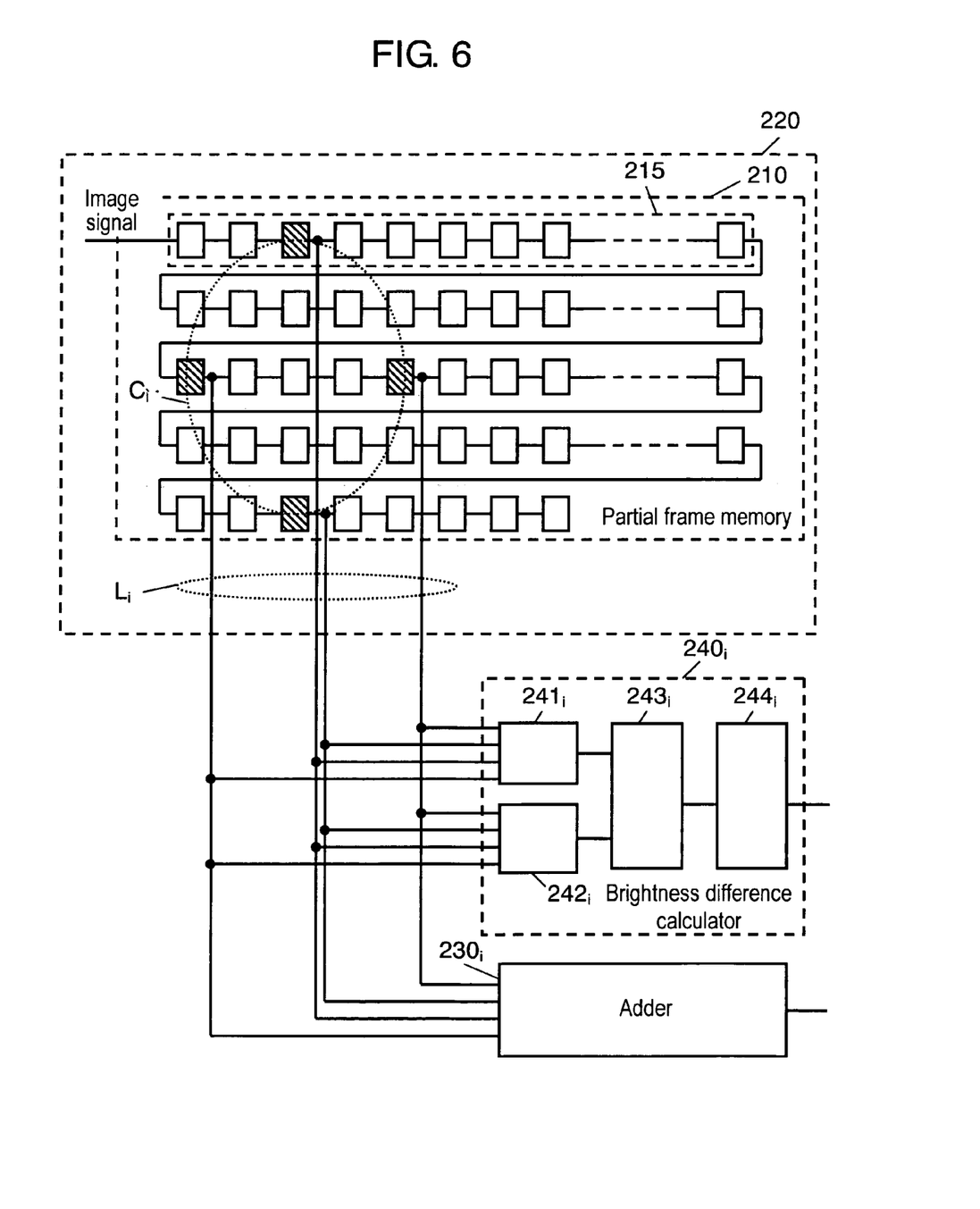
FIG. 6 is a circuit drawing of an image data extraction unit of the pupil detection device according to the second embodiment of the present invention.

FIG. 6 is a circuit drawing of image data extraction unit 220. FIG. 6 also shows adder $230_i$ corresponding to one of integrating circle $C_i$ and luminance difference calculator $240_i$. Image data extraction unit 220 includes partial frame memory 210, and drawing lines L for outputting the image data. Partial frame memory 210 is composed of line memories 215 of first-in first-out (FIFO type) connected in series.

The image data of m pixels on integrating circle $C_i$ on outputted by drawing line $L_i$. For clarifying the illustration, FIG. 6 only shows one integrating circle $C_i$, and four drawing lines $L_i$ for outputting the four image data located on the circumference thereof. However, in the second embodiment, eight data drawing lines are outputted from each of twenty integrating circles $C_1$-$C_{20}$.

Then, every time when image data is entered into partial frame memory 210 by one pixel, the entire image held in partial frame memory 210 is shifted by one pixel. Therefore, the image data outputted from drawing lines $L_i$ is also shifted by one pixel. In other words, when image data is entered into partial frame memory 210 by one pixel, integrating circles $C_1$-$C_n$ move toward the right by the amount corresponding to one pixel on the eye image, and when the image data corresponding to one line is entered, integrating circles $C_1$-$C_n$ move downward by the amount corresponding to one line on the eye image.

When image data which corresponds to one frame is entered into partial frame memory 210, integrating circles $C_1$-$C_n$ scan the entire eye image on the eye image. The center coordinates (X, Y) of the integrating circle at this time is shown by the outputs from X counter 262 and Y counter 264.

Contour integrating unit 230 is provided with independent adders $230_1$-$230_n$ for respective integrating circles $C_1$-$C_n$, m image data positioned on the circumference of each integrating circle $C_i$ are added, and each added result is outputted to pupil radius detection unit 250 as integrated value $I_i$.

Luminance difference calculation unit 240 is provided with independent luminance difference calculators $240_1$-$240_n$ for each integrating circle $C_1$-$C_n$. Each luminance difference calculator $240_i$ includes maximum value detector $241_i$ for detecting the maximum value of m pixel data positioned on the circumference of integrating circle $C_i$, minimum value detector $242_i$ for detecting the minimum value, subtracter $243_i$ for calculating difference $B_i$ between the maximum value and the minimum value, and comparator $244_i$ for comparing difference $B_i$ and luminance difference threshold Bth. Then, n compared results are outputted to pupil radius detection unit 250.

Pupil radius detection unit 250 is provided with n−1 subtracters $252_1$-$252_{n-1}$, selector 253, comparators 254, 255, and register 256. Subtracter $252_1$-$252_{n-1}$ each obtains the difference of integrated value $I_i$ of each integrating circle $C_i$ with respect to radius R. In other words, difference value $\Delta I_i$ between integrated values $I_i$ and $I_{i-1}$ for integrating circles $C_i$ and $C_{i-1}$ which are one-step different in radius out of integrating circles $C_1$-$C_n$ is obtained.

However, when the output of luminance difference calculator 240i with respect to integrating circle $C_i$, that is, difference $B_i$ between the maximum value and the minimum value of the image data is larger than luminance difference threshold Bth, difference value $\Delta I_i$ is forcedly set to zero. Then, selector 253 selects the largest difference value $\Delta I$ and radius R of the integrating circle at this moment. Comparator 254 compares the largest difference value $\Delta I$ and difference threshold $\Delta$Ith, and when difference value $\Delta I_i$ is larger than difference threshold $\Delta$Ith, difference value $\Delta I_i$ is outputted to comparator 255.

Comparator 255 compares an old difference value $\Delta$Iold retained in register 259 and difference value $\Delta$Inew newly entered from comparator 254. When difference value $\Delta$Inew is larger than old difference value $\Delta$Iold, data of register 259 is rewritten to newly entered difference value $\Delta$Inew. Simultaneously, the data of register 256 is rewritten to new radius Rnew sent from selector 253.

When difference value ΔInew does not exceed old difference value ΔIold, such rewriting is not performed. Therefore, after the aforementioned operation corresponding one frame, register 256 retains the radius of the integrating circle which is larger than difference threshold ΔIth and which makes difference value ΔI to the largest value as radius $R_0$.

As described above, in the second embodiment of the present invention, when difference $B_i$ between the maximum value and the minimum value of the image data with respect to integrating circle $C_i$ is larger than luminance difference threshold Bth, difference value $\Delta I_i$ is forcedly set to zero. Therefore, when difference $B_i$ is larger than luminance difference threshold Bth, radius $R_i$ is not outputted to pupil position detection unit 280.

As described using FIG. 3 in the first embodiment, when the centers of integrating circles $C_1$-$C_n$ coincide with the center of the pupil, difference $B_i$ between the maximum value and the minimum value of the pixel data does not exceed a certain limited value. However, when they do not coincide with the center of the pupil, the difference $B_i$ is large. Therefore, by excluding information of the case in which difference $B_i$ is larger than luminance difference threshold Bth, the possibility of erroneous detection can be reduced, and the pupil detection accuracy can be improved.

Pupil position detection unit 280 includes two registers 286, 287, and retains values of X counter 262 and Y counter 264 in registers 286, 287. Then, every time when the data in register 256 of pupil radius detection unit 250 is rewritten, the contents of registers 286, 287 are also rewritten. Therefore, after the aforementioned action corresponding to one frame, the center coordinates of the integrating circle which is larger than difference threshold ΔIth and which makes difference value ΔI to the largest value are retained in registers 286, 287 as pupil position coordinates ($X_0$, $Y_0$).

Figure 7:
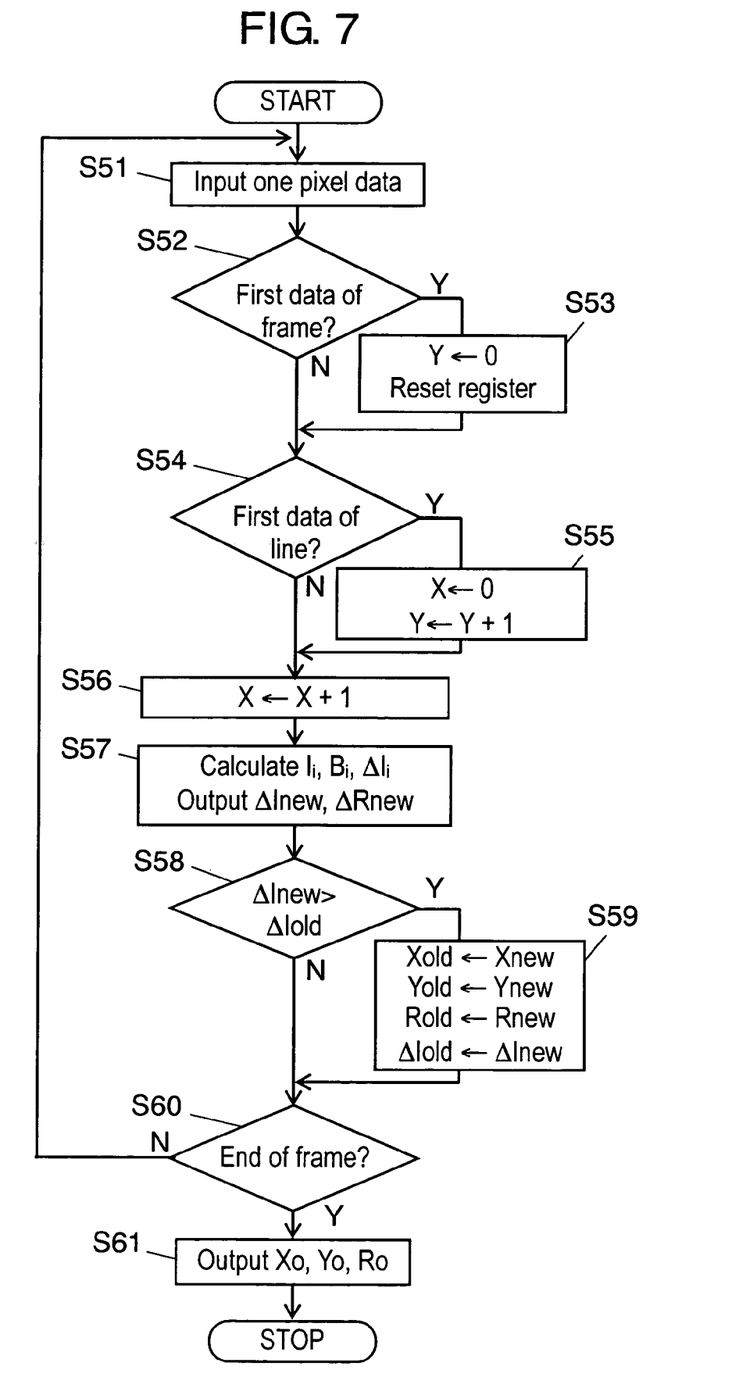
FIG. 7 is a flowchart showing an operation corresponding to one frame of the eye image of the pupil detection device according to the second embodiment of the present invention.

Subsequently, the operation of pupil detection device 200 will be described. In the following example, the eye image data is a sequentially scanned data, and one frame includes, for example, digital data of, 480 lines×640 pixels. FIG. 7 is a flowchart showing the operation of pupil detection device 200 according to the second embodiment of the present invention corresponding to one frame of eye image.

Pupil detection device 200 acquires image data which corresponds to one pixel (S51). When the acquired image data is a first data of one frame (S52), Y counter 264 is reset and respective registers 286, 287 of pupil position detection unit 280 are reset (S53). When acquired data is a first data of one line (S54), X counter 262 is reset and Y counter 264 is incremented (S55). Then, X counter 262 is incremented (S56).

Subsequently, acquired image data is acquired in partial frame memory 210. Then, m image data each time, and n×m image data are outputted from each integrating circle $C_i$ out of pixels corresponding to n integrating circles $C_1$-$C_n$ on the eye image. Then, adder $230_i$ corresponding to each integrating circle $C_i$ calculates integrated value $I_i$ of each image data, and luminance difference calculator $240_i$ calculates difference $B_i$ between the maximum value and the minimum value of image data. Subtracter $252_i$ of pupil radius detection unit 250 calculates difference value $\Delta I_i$ of each integrating value $I_i$.

However, at this time, when difference $B_i$ is larger than luminance difference threshold Bth, difference value $\Delta I_i$ is forcedly set to zero. Then, selector 253 and comparator 254 output difference value ΔInew which is the largest among difference values $\Delta I_i$ and is larger than difference threshold ΔIth and radius Rnew of the integrating circle corresponding thereto to registers 259, 256, respectively (S57). Comparator 255 compares newly entered difference value ΔInew and old difference value ΔIold retained in register 259 (S58).

When difference value ΔInew is larger than ΔIold, the contents of register 259 are rewritten into new difference value ΔInew, and simultaneously, the contents of register 256 and registers 287, 286 of pupil position detection unit 280 are also rewritten into new radius Rnew and new coordinate values Xnew, Ynew, respectively, (S59). Then, whether or not the acquired data is the data at the end of one frame is determined (S60), and if not, the procedure goes back to Step S51.

When the image data to be entered reaches the last pixel of one frame, the data retained in registers 256, 286, 287 are outputted. At this time, when the pupil is detected, the data retained in registers 256, 286, 287 represent radius $R_0$ of the pupil, X-coordinate $X_0$ of the pupil, and Y-coordinate $Y_0$ of the pupil. When the pupil is not detected, since registers 256, 286, 287 are still in a state of being reset in Step S53, all the retained data are zero (S61).

Among the flows described thus far, the series of operations from Step S51 to Step S60 are performed for each entry of the image data to partial frame memory 210 by the amount corresponding to one pixel. For example, when the frame frequency is 30 Hz, and the eye image includes 640×480 pixels, the above-described series of operations are carried out within 1/(30×640×480) seconds. Then, when one pixel is inputted to partial frame memory 210, the integrating circle moves by an amount corresponding to one pixel on the image, and hence the integrating circle scans on the image once during the time when the image of one frame is entered. In this manner, the pupil is detected on the real time basis with respect to the image data picked up by the image pickup unit by using a circuit of relatively small scale.

Although the number of the concentric integrating circles is twenty and the number of image data outputted from one integrating circle is eight in this embodiment, these numbers are preferably determined considering the detection accuracy, processing time, and the scale of the circuit in parallel.

According to the present invention, the pupil detection device and the iris authentication apparatus which can detect the position of the pupil at high-speed and with high degree of accuracy is provided.

INDUSTRIAL APPLICABILITY

As the present invention can provide the pupil detection device which can detect the position of the pupil at high-speed and with high degree of accuracy, it is effective for the iris authentication apparatus or the like which is used for personal authentication.

The invention claimed is:
1. A pupil detection device comprising:
a pupil candidate detection unit for detecting positions and radii of pupil candidates which may be candidates of a pupil in an eye image; and
a luminance difference calculation unit for obtaining a difference between a maximum value and a minimum value of luminance of an image data of the eye image on a circumference of a circle having a center at center coordinates of the pupil candidate and a predetermined radius, wherein the corresponding pupil candidate is determined not to be the pupil when the difference of luminance obtained by the luminance difference calculation unit is larger than a predetermined threshold.
2. The pupil detection device of claim 1, wherein the predetermined radius is larger than the radius of the pupil candidate.

3. A pupil detection device comprising:

an image data extraction unit for determining a plurality of concentric circles on an eye image as integrating circles respectively, and extracts image data of the eye image positioned on circumferences of the integrating circles, a contour integrating unit for integrating the image data extracted by the image data extraction unit along the respective circumferences of the integrating circles, a pupil radius detection unit for detecting that an integrated value obtained by the contour integrating unit has changed stepwise with respect to the radius of the integrating circle, a pupil position detection unit for detecting the center coordinates of the integrating circle as the pupil position coordinates when the pupil radius detection unit detects the change stepwise, and a luminance difference calculation unit for obtaining a difference between a maximum value and a minimum value of the image data extracted by the image data extraction unit along the circumference of each of the integrating circles, wherein the integrated value of the corresponding integrating circle is determined to be ineffective when the output of the luminance difference calculation unit is larger than the predetermined threshold for each integrating circle.

4. An iris authentication apparatus comprising the pupil detection device of claim 1.

5. An iris authentication apparatus comprising the pupil detection device of claim 2.

6. An iris authentication apparatus comprising the pupil detection device of claim 3.

* * * * *